United States Patent [19]

Borcuch et al.

[11] Patent Number: 5,063,956
[45] Date of Patent: Nov. 12, 1991

[54] FLUID DELIVERY PRESSURE CONTROL SYSTEM

[75] Inventors: John P. Borcuch, Williamsville; Norman H. White, East Amerst, both of N.Y.

[73] Assignee: Union Carbide Industrial Gases Technology Corporation, Danbury, Conn.

[21] Appl. No.: 607,295

[22] Filed: Oct. 31, 1990

[51] Int. Cl.$^5$ ............................................. G05D 16/06
[52] U.S. Cl. ....................................... 137/14; 137/468; 137/489
[58] Field of Search ................... 137/489, 505.18, 906, 137/468, 14

[56] References Cited

U.S. PATENT DOCUMENTS

| | | | |
|---|---|---|---|
| 2,047,101 | 7/1936 | Grove | 137/906 X |
| 2,902,047 | 9/1959 | Tavener | 137/505.18 |
| 3,095,897 | 7/1963 | Pennstrom | 137/505.18 X |
| 3,362,177 | 1/1968 | Case | 62/55 |
| 3,977,423 | 8/1976 | Clayton | 137/489 X |
| 3,982,559 | 9/1976 | Ochs | 137/505.18 X |
| 4,080,800 | 3/1978 | Spaulding | 62/51 |
| 4,619,115 | 10/1986 | Weber | 62/217 |
| 4,966,183 | 10/1990 | Williamson | 137/489 |

OTHER PUBLICATIONS

"Pressure Regulation in Distribution", Gas Engineers Handbook, R. J. Ott, J. M. Pickford, and F. E. Vandaveer, 1965, pp. 9/47–9/61.
"Internal-Pistol Piston-Operated Regulating Valves", *The Process Instruments and Controls Handbook*, J. T. Muller, 1957, pp. 10-58 through 10-68.
"Simplified Instrumentation", *Instruments*, J. S. Leslie, vol. 22, Aug. 1949, pp. 670-674.

*Primary Examiner*—Alan Cohan
*Attorney, Agent, or Firm*—Peter Kent

[57] ABSTRACT

System and method for controlling process fluid flow to maintain a set delivery pressure at varying demand, including a fluid-loaded, self-operated main regulator and a method for providing the loading pressure therefor. The system also includes a flow restrictor for metering the loading fluid flow, a back-pressure regulator for controlling the loading fluid pressure, and a temperature-actuated regulator for venting loading fluid when the process fluid temperature varies from a selected range.

29 Claims, 2 Drawing Sheets

FLUID DELIVERY PRESSURE CONTROL SYSTEM

TECHNICAL FIELD

This invention pertains to a method and a system for controlling the flow of process fluid to a consumer conduit so as to maintain a desired pressure in the consumer conduit.

BACKGROUND

It is often desired to supply fluid form a high-pressure source to a consumer conduit at a given reduced pressure while maintaining that pressure for all flows required by the consumer. One example is the supply of gas from a storage vessel of liquified gas such as oxygen or nitrogen. Liquified gas form the storage vessel is pumped into a vaporizer comprising heat exchanging tubes having fins exposed to natural convection in the atmosphere. In an alternate method, the pressure of evaporated liquified gas is allowed to build up in the vessel, thereby pressurizing the vessel and the liquid delivered form the vessel to the vaporizer. The pressure regulation task is made particularly difficult in that as the liquid cryogen boils in the vaporizer, the boiling front location shifts unstably back and forth causing sizable swings in the pressure. Swings of ±20 psi are typical from such vaporizer surging. From the vaporizer, the gas is regulated to the desired pressure and delivered into the consumer conduit for supply to the consumer's process. The process may consume gas at varying rates and include periods of nonconsumption.

Such an installation is expected to function unattended in all weather conditions. Automatic protection against unusual circumstances therefore is required. The delivery of gas at too cold a temperature, or the delivery of unevaporated liquid is to be prevented to avoid thermal shock, embrittlement and upset of the consumer's facilities. Thus a device is desirable to interrupt the supply of fluid to the consumer conduit if the fluid emerging from the vaporizer falls below a given temperature, for example, $-40°$ F.

Available for the desired service are a host of capable electrical and pneumatic controllers employing feedback loops and offering sophisticated actions such as proportional, reset and rate response to deviations from a set point. These controllers, however, are complex, costly and require maintenance of a high degree of skill. Electrical controls of this type also require protection against extremes of cold, hot and inclement weather.

Simple, self-contained regulators are also available which when operated over a wide range of flow provide only a rough degree of pressure regulation. These designs typically balance a loading force against the force of the outlet pressure of the regulator acting over the area of a diaphragm. The diaphragm deflects in the direction of the larger of these forces. A valve is linked to the diaphragm so that when the loading force is larger, the valve will open, and when the force of outlet pressure acting over the diaphragm is larger, the valve will close. The loading force must be held constant in order to hold downstream pressure steady.

A spring is commonly used to supply the loading force on the diaphragm. Usually the force the spring exerts against the diaphragm can be varied with an adjusting screw. As the diaphragm deflects, the length of the spring changes and thereby the loading force. This effect generates a serious control error that becomes greater as flow varies from zero to maximum.

Another major source of control error in prior art regulators is due to the force of inlet pressure acting on the valve plug. This force is transmitted through the linkage to the diaphragm and acts against the loading force. The set point provided by the spring force is effectively reduced as inlet pressure rises, and increased as inlet pressure falls. In order to minimize this effect the valve orifice is typically made small resulting in low capacity compared to the size of the valve.

The force to deflect the diaphragm represents yet another prior art regulator control error. This force against opposes the loading force reducing the set point as the valve opens.

Still another prior art control error is introduced by the amount of force required to seal the valve over and above the force exerted by inlet pressure. This phenomenon called lockup, is determined by the stiffness and surface finish of the mating sealing surfaces.

Commonly, the performance of simple regulators is improved by using a pressure loaded configuration in which the diaphragm is loaded with fluid pressure rather than the spring described earlier. Such practice addresses the control error caused by the spring, but not the additional factors discussed above. Pressure loading is accomplished by employing a pressure tight chamber called the dome whose inner surfaces include the diaphragm. The dome is commonly pressurized using a spring loaded regulator called a loading regulator to reduce pressure from a loading pressure source to the required pressure. The loading pressure source may be either the inlet fluid which is being regulated or a separate fluid source such as instrument air.

The volume of the dome changes as the diaphragm deflects to open and close the valve. In order to hold the dome pressure constant, loading fluid must be added when the diaphragm deflects to open the valve, and loading fluid must be released when the diaphragm deflects to close the valve. Since the loading regulator can only add gas to the dome, a variation in loading pressure results. Some improvement in holding loading pressure constant can be achieved by specifying a loading regulator with a self relieving feature. Such a regulator vents loading fluid when the downstream pressure exceeds the set value by an increment dependent on its specific design. The variation in loading pressure is thereby limited to this increment.

An object of the present invention is to provide a method and system for controlling a process fluid flow over a wide flow range so as to maintain a prescribed downstream pressure within moderately accurate limits. Another object is to provide an apparatus to reduce or terminate the process fluid flow should the process fluid temperature drop below a prescribed temperature.

Features of this invention are that its working items are self-operated, simple and rugged. No additional power source or control fluid source is required.

Advantages of this invention are low initial cost and low maintenance requirements of moderate skill level.

Other objects, features and advantages are pointed out and become apparent in the subsequent description of the invention.

SUMMARY OF THE INVENTION

The invention provides a system for controlling the flow of a process fluid from a source conduit with wide pressure swings to a consumer conduit so as to maintain a set delivery pressure at varying rates of demand. The primary control element for the process fluid is a main pressure regulator having a housing enclosing a diaphragm. The upper portion of the diaphragm housing has a port for admitting fluid to load the diaphragm and the lower portion a port open to the outlet side of the regulator.

The main regulator has a number of other features in addition to its fluid loaded diaphragm to provide high control accuracy. A large-diameter metal plug mates with a large orifice having a compliant seat with metal backing to minimize the lock-up force required to compress the seat and prevent leakage. The metal plug is pressure balanced such that it experiences no net force due to upstream pressure. With the large orifice, a small amount of plug travel provides a large opening requiring only a small maximum deflection of the diaphragm. The diaphragm itself is very flexible requiring little deflection force.

The loading pressure is provided either by tapping process fluid from the source conduit or from a separate pressure supply such as instrument air. The loading fluid flows through a minute, flow restricting orifice. This minute control fluid flow is directed to the loading port on the main regulator. To adjust and control the pressure of the control fluid at the loading port, the loading port is also connected to the inlet of a back pressure regulator discharging to atmosphere. The back pressure regulator is an ordinary regulator with a diaphragm loaded by an adjustable spring to set the desired back pressure. Since the back pressure regulator is exposed to constant pressures at its inlet and outlet and passes only a small flow, it accurately controls the control fluid pressure at the main diaphragm loading port.

The system, in a first embodiment, additionally connects the inlet of a temperature-actuated regulator to the outlet of the flow restrictor. When the process fluid in the source conduit drops below a prescribed temperature, the temperature-actuated regulator opens to atmosphere thereby venting the control fluid, unloading the main regulator diaphragm and closing the main regulator.

In a second embodiment of the invention, an auxiliary regulator is added in parallel with the flow restrictor to supply a supplementary flow of control fluid flow from the source conduit. The auxiliary regulator is set to close at an outlet pressure which is a substantial percentage of the desired pressure. The auxiliary regulator rapidly supplies control fluid from the source conduit to provide a fast response to increased demand in the consumer conduit, reflected as a significant decrease in the loading pressure, yet allows the back pressure regulator to accurately maintain the set loading pressure. The main regulator opens rapidly to the set point of the auxiliary regulator and then opens slowly to achieve the final set pressure established by the back pressure regulator.

In the second embodiment, the temperature-actuated regulator is interposed in the control fluid conduit between the main regulator loading port and the combined discharges of the flow restrictor and the auxiliary regulator. When the process fluid in the consumer conduit drops below a prescribed temperature, this temperature-actuated regulator blocks the combined control fluid flow from the auxiliary regulator and the flow restrictor, and simultaneously vents to atmosphere the control fluid at the main regulator loading port.

The invention described thus provides a method for providing and maintaining substantially constant a control fluid loading pressure in the loading side of a regulator housing enclosing a pressure-responsive means. The method comprises providing a limited, continuous flow of pressurized control fluid to the loading side of the regulator housing and venting control fluid flow in excess of that required to fill and maintain the selected loading pressure in the loading side of the regulator housing as the pressure-responsive means moves and varies the volume on the loading side of the regulator housing.

DESCRIPTION OF THE PREFERRED EMBODIMENTS

Figure 1:
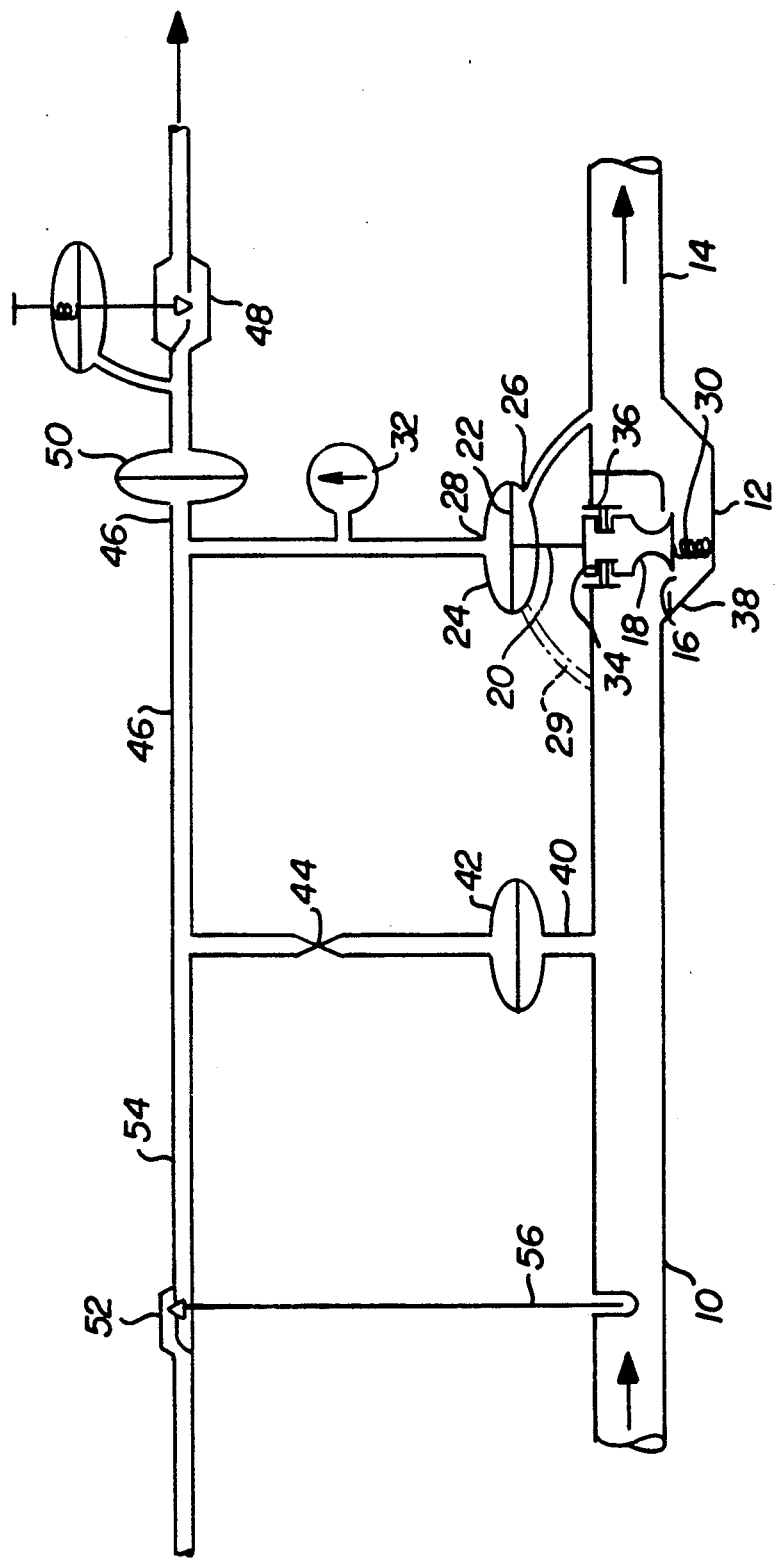
FIG. 1 is a schematic representation of a first embodiment of the invention.

Referring to FIG. 1, the flow of high pressure fluid from the source conduit 10 is controlled by the main regulator 12 to maintain the fluid pressure in the customer conduit 14 at a selected pressure. Accordingly, the source conduit 10 is connected to the inlet port of the main regulator 12, and the customer conduit 14 is connected to the outlet port of the main regulator 12. The main regulator 12 has an orifice 16, a plug 18, and a means 20 for positioning the plug 18 in the orifice 16 to control the fluid flow therethrough. The plug positioning means 20 as shown includes a diaphragm 22 in a housing 24, (which might alternately be a piston in a cylinder, or the like) and a linkage connecting the diaphragm 22 to the plug 18.

The diaphragm housing 24 has a lower port 26 on its lower side through which fluid from the outlet port of the main regulator 12 is admitted to contribute to the positioning of the plug positioning means 20. The diaphragm housing 24 also has a loading port 28 on its upper side through which a control fluid is admitted to contribute to the positioning of the plug positioning means 20. Thus the diaphragm 22 responds to the difference in these two pressures. A spring 30 may be used to bias the plug 18 to close the orifice 16 when no fluid pressure is applied to either side of the diaphragm 22, or should the diaphragm develop a leak which substantially equalizes fluid pressures on the diaphragm. This provides a fail-closed function. A spring force corresponding to a pressure difference of between 1 and 25 psi acting over the diaphragm 22 is suitable and a force corresponding to a pressure difference of 3 and 8 psi is preferred. If a bias spring is used, the loading pressure must be higher than the desired outlet pressure by an increment equal to the above corresponding pressure of the bias spring.

To open the orifice 16, a selected loading pressure is applied and maintained constant by a control fluid on the top of the diaphragm 22 through the loading port 28. A gage 32 is provided for observing and setting the loading pressure. Control is achieved as the diaphragm 22 responds to increases and decreases in downstream process fluid pressure by moving to reduce or augment the opening of the orifice 16.

With a selected constant pressure applied to the top of the main regulator diaphragm 22, for the main regulator 12 to maintain a steady, selected pressure in the consumer conduit 14, the plug positioning means 20 must respond substantially to variations in the consumer conduit pressure and insubstantially to other forces. Accordingly in this invention, the main regulator plug 18 is made insensitive to variations in upstream pressure. Also, the mechanical and the parasitic forces acting on the plug positioning means 20 are kept small. Finally, the variations in mechanical and parasitic forces imposed on the plug positioning means 20 are insignificant relative to the forces developed by the downstream pressure on the plug positioning means. These are accomplished as follows.

The upstream fluid pressure forces acting on the main regulator plug 18 are balanced, and exert no net force on it. To this end, the plug area on which the upstream fluid pressure acts to close the orifice 16 is equal to the plug area on which the upstream fluid pressure acts to open the orifice. This necessitates that the plug be sealed against leakage of process fluid at a diameter magnitude approximately equal to the diameter of the orifice. Accordingly, a low-friction ring seal 34 retained in a groove in the plug seals against a plug cylinder wall 36 having a diameter approximately equal to the orifice diameter. With the plug insensitive to upstream pressure, a large plug diameter and a correspondingly large orifice is useable.

A ratio for the diameter of the orifice 16 to the diameter of the source conduit 10 in the range of 0.3 to 2.0 is usable, and a range of 1.0 to 1.5 is preferred. Thus large orifice openings result with only small travel for the plug and little deflection of the plug and associated diaphragm. A maximum travel for the plug of between 0.1 and 0.5 times the orifice diameter is desirable and between 0.1 and 0.3 times the orifice diameter is preferred.

The main regulator diaphragm 22 is fabricated of a very flexible material and requires little force for deflection. The diaphragm remains flexible over the operating temperature range, and withstands unbalanced pressures developed during transients. A diaphragm having a load-deflection characteristic in the range of 0.01 to 0.5 psi per inch of centerpoint deflection is suitable and a characteristic of 0.1 to 0.2 psi per inch is preferred. The diaphragm provides an area which develops a control force from the downstream pressure which is large relative to the mechanical and parasitic forces imposed on the plug positioning means. A diaphragm area in the order of 2 to 6 times the area of conduit 10 is suitable. Typically the inlet port of the main regulator 12 is the same size as the inlet conduit.

Finally, the seat 38 provided for the plug 18 to close the orifice 16 is a hard plastic backed by metal requiring little compression of the seat to seal against the metal plug. Thus the force to compress and seal the plug to the seat, known as the lockup force, is small, A lockup force corresponding to a pressure difference of between 2 and 3 psi acting over the diaphragm is desirable As explained earlier, to control the process fluid flow so as to maintain the fluid pressure in the consumer conduit 14 at a selected pressure, a constant loading Pressure must be applied to the top side of the main regulator diaphragm 22. The source of the loading pressure may be the source conduit 10 or a separate fluid supply such as instrument air.

Thus, control fluid is supplied into the control fluid conduit 40, and directed through an optional filter 42 intended to protect downstream components. The control fluid conduit 40 leads to the inlet of a fixed flow restrictor 44 which can take various forms including an orifice, a venturi, a nozzle, or a section of capillary tubing. Since the control fluid has value and is ultimately vented to atmosphere, a very low consumption is desired. Thus, the flow opening in the flow restrictor 44 is very fine. Orifices with a diameter of 0.001 to 0.030 inches are useable and inexpensive. With a preferred orifice diameter of 0.004 to 0.01 inches, the consumption of control fluid is acceptably low at 1 to 2 scfh. To prevent this small orifice from clogging, an upstream filter 40 capable of retaining foreign particles with a size not less than ⅛ times the diameter of orifice 16 has been found appropriate. An absolute rating of 1/6th the orifice diameter is preferred. The outlet of the flow restrictor 44 communicates through the control fluid conduit 46 with the main regulator loading port 28.

The main regulator loading port 28 is connected also by control fluid conduit 46 to the inlet of a back pressure regulator 48. This regulator 48 provides a means for setting the pressure applied to the main regulator loading port 28. Since at steady state all of the control fluid flowing through the flow restrictor 44 flows through the back pressure regulator 48, a filter 50 similar to filter 42 may be installed upstream of its inlet. The control fluid stream flowing through the back pressure regulator 48 typically does not have sufficient pressure to be recovered by injection into the consumer conduit 14, and discharges to atmosphere.

The back pressure regulator 48 is adjustable over the range of pressures desired in the consumer conduit 14 and is chosen from inexpensive, commercially available units of appropriate size. Since this regulator passes a small flow, which is a small fraction of its capacity, the deflection of its loading spring and diaphragm is small, causing little control error. Also, since the regulator is exposed to essentially unvarying pressures at its inlet and its outlet, an unbalanced plug design does not contribute control error. Further, since bubble-tight shut off is not necessary, metal-to-metal seating is adequate. Hence, the lock-up force needed is small and produces little control error. Thus, accurate pressure control is obtained from a simple, inexpensive regulator.

The control fluid system as heretofore described provides and maintains constant the selected loading pressure on the main regulator 12 whereby it can maintain a steady, selected pressure in the consumer conduit 14. The control fluid system functions as follows. When the main regulator diaphragm 22 moves upward, the back pressure regulator 12 momentarily increases its control fluid discharge to accommodate the control fluid volume decrease in the upper portion of the main regulator diaphragm housing 24. When the diaphragm moves downward, the regulator momentarily decreases its control fluid discharge to accommodate the control fluid volume increase in the upper portion of the main regulator housing 24.

In installations of the first embodiment of the invention, upon startup of process fluid supply to the consumer conduit 14, the minute flow of control fluid through the flow restrictor 44 allows a slow buildup of control fluid pressure in the upper portion of the main regulator diaphragm housing 24. Thus, the main regulator orifice 16 opens slowly and allows process fluid pressure to build slowly in the consumer conduit 14, a characteristic suitable for many consumer applications, particularly the supply of oxygen. Similarly, a sudden large increased consumption of process fluid causes a decline in the consumer conduit pressure and a corresponding increase in downward diaphragm deflection requiring additional control fluid in the upper portion of the diaphragm housing 24. The additional fluid is supplied through the flow restrictor 44 in a finite time during which the momentary decline in pressure persists in the consumer conduit 14. Contrarily, decreases in process fluid consumption are almost instantaneously compensated as the back pressure regulator 12 rapidly discharges excess control fluid from the main regulator housing 24 when the main regulator diaphragm 22 is deflected upward.

In an application where a cryogenic process fluid is supplied to a consumer conduit, protection against delivery of process fluid at an unsuitably low temperature is desirable. In the first embodiment of the invention, as further depicted in FIG. 1, such protection is provided by a normally-closed, temperature-actuated regulator 52, the inlet of which communicates by control fluid conduit 54 with the loading port 28 of the main pressure regulator 12. The temperature-actuated regulator 52 discharges to a low-pressure sink such as the atmosphere. Means 56 for sensing the temperature of the process fluid in the source conduit and opening the temperature actuated regulator at and below a selected temperature is provided. Such means 56 may comprise a solid thermostatic element with linkage, a closed liquid filled system, a solenoid responsive to a thermocouple, or other device known in the art. Thus, should the process fluid temperature in the source conduit drop to a selected temperature, −40° F., for example, the temperature-actuated regulator 52 opens the control fluid conduit 54 to the atmosphere. Control fluid discharges, thereby relieving the pressure at the loading port 28 of main regulator 12 and reducing or ceasing process fluid flow through the main regulator 12. During the low temperature condition in the supply conduit 10, the minute flow of control fluid through the flow restrictor 44 is partially or entirely vented through the temperature-actuated regulator 52.

The temperature valve may be set up to behave in several ways:

1. To open proportionally to the level the fluid temperature in the source conduit is below the set temperature.
2. To open fully when the fluid temperature in the source conduit is below the set temperature and to close fully when it exceeds some increment above the set temperature.
3. To open fully when the fluid temperature in the source conduit is below the set temperature and not reopen until the valve is manually reset for a human operator.

The temperature-actuated regulator 52 mentioned above may be of a commercially available configuration.

Figure 2:
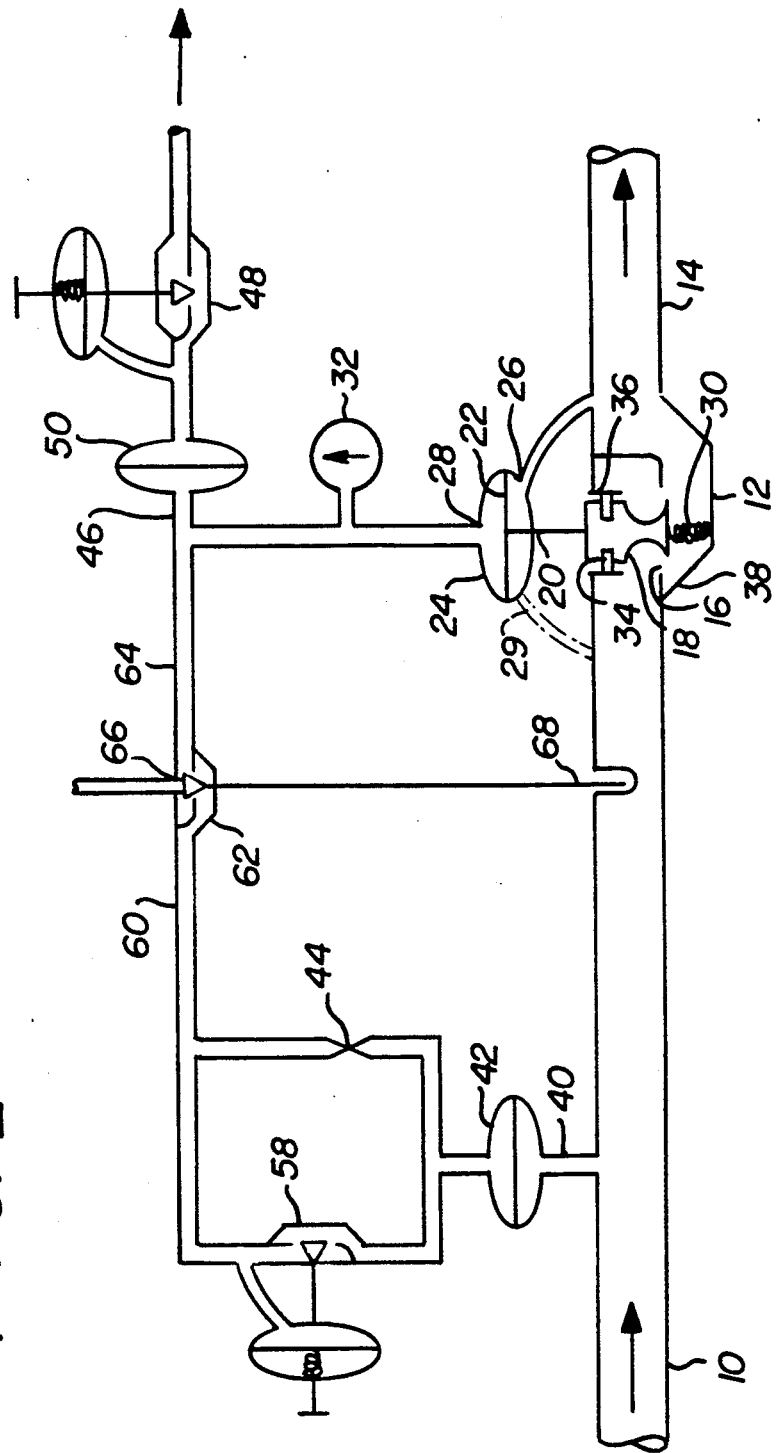
FIG. 2 is a schematic representation of a second embodiment of the invention.

A second embodiment of the invention, as depicted in FIG. 2, has two changes from the first embodiment. One change is the addition of an auxiliary regulator 58 installed in parallel with the flow restrictor 44. The auxiliary regulator 58 is adjusted to close at an outlet pressure equal to a substantial percentage, e.g., 50 to 95%, of the loading pressure desired for the main regulator. Since the pressure at which the auxiliary regulator 58 closes is not critical in magnitude or constancy, the auxiliary regulator can be an ordinary, inexpensive, commercially available regulator.

The function of the auxiliary regulator 58 is to provide a large initial flow of control fluid to increase the supply fluid pressure from a low level up to the closing level of the auxiliary regulator 58. Thereafter, when the auxiliary regulator 58 is closed, control fluid is supplied only at a minute rate through the flow restrictor 44. Thus, the second embodiment provides rapid startup of process fluid supply to the consumer conduit 14 and a rapid compensation for large increases in process fluid demand in the consumer conduit 14.

The second change found in the second embodiment is in the location and nature of its temperature-actuated regulator. In the second embodiment, the flow restrictor 44 outlet and the auxiliary regulator 58 outlet are connected by control fluid conduit 60 to the inlet of another variety of temperature-actuated regulator 62. The outlet of the temperature-actuated regulator 62 is connected by control fluid conduit 64 to both the inlet of the back pressure regulator 48 and the loading port 28 on the main regulator 12. In the temperature-actuated regulator 62, its inlet is normally in open communication with its outlet, and its outlet has a normally-closed vent 66 to the atmosphere. Included is a means 68 for sensing the temperature of the process fluid in the source conduit 10, which at and below a selected temperature closes the communication between the inlet and outlet of the temperature-actuated regulator 62 and opens its vent 66.

While the main regulator 12 as described is suitable for adjusting the process fluid flow to maintain a selected pressure at its outlet, an alteration makes it suitable for adjusting the process fluid flow to maintain a selected pressure at its inlet. The alteration exposes the lower side of its diaphram to the process fluid pressure at its inlet port rather than its outlet port. This is shown in FIG. 1 and FIG. 2 as a conduit 29 (in dotted lines) connecting the lower portion of diaphragm housing 24 with the inlet port of the regulator 12. While the conduit 29 is in service, the conduit shown from port 26 to the outlet port of regulator 12 would be out of service, that is, closed off, or removed with the port 26 and the associated tap opening in the outlet port of regulator 12 closed off.

EXAMPLE

The invention was employed to supply nitrogen to a tire curing press. Typically, after charging with latex. a press is pressurized with steam at 250 to 275 psig. After seven minutes, the steam valve to the press is closed and a valve is opened to the nitrogen consumer conduit. The nitrogen consumer conduit is supplied nitrogen gas through a regulator from a vaporizing system and cryogenic storage tank at 425 psig.

The nitrogen valve to a press remains open for the remaining eleven minutes of the cycle during which nitrogen replaces any condensing steam. Conventional pneumatic control valves in this application produced unacceptable overshoot when a press was switched from the steam supply to the nitrogen supply conduit. The first embodiment of this invention, when installed to control nitrogen supply to a single press, brought and maintained the press pressure to 400 ± 1 psig within thirty seconds after the switch from the steam supply to the nitrogen supply. However, during the initial thirty seconds following the switch, the nitrogen pressure in the consumer supply conduit dropped and recovered.

In production, a single consumer conduit supplies a bank of presses which are switched from steam to nitrogen supply at varying times. A momentary drop in pressure in the consumer conduit upon switching a press onto the consumer conduit would disturb presses already into the nitrogen pressure maintenance phase of the cycle. The second embodiment of the invention, in this application, produced no appreciable momentary drop in pressure in the consumer conduit and otherwise performed satisfactorily.

What is claimed is:

1. A system for controlling process fluid flow from a source conduit to a consumer conduit to maintain a set delivery pressure at varying demand, said system comprising:
   (a) a main regulator having:
      (1) an inlet port for connection to the source conduit;
      (2) an outlet port for connection to the consumer conduit;
      (3) an orifice communicating with said inlet port and said outlet port;
      (4) a loading port;
      (5) a plug adapted for positioning to vary the opening of said orifice; and
      (6) plug positioning means for positioning said plug in response to the difference in pressure of fluid in said outlet port and pressure of fluid in said loading port;
   (b) a flow restrictor an inlet and an outlet;
   (c) a control fluid conduit for connecting said inlet of said flow restrictor to a source of control fluid;
   (d) a control fluid conduit connecting from said outlet of said flow restrictor to said loading port on said main regulator;
   (e) a back-pressure regulator having:
      (1) an outlet port open to a low pressure sink;
      (2) an inlet port;
      (3) a housed diaphragm adjustably loaded on one side by an adjustable spring and on the other side by communication with the fluid in said inlet port of said back-pressure regulator; and
      (4) a valve between said inlet port and said outlet port operated by said diaphragm; and
   (f) a control fluid conduit connecting said inlet port on said back-pressure regulator with said loading port on said main regulator.

2. The invention as in claim 1 wherein the source of control fluid is process fluid in the source conduit.

3. The invention as in claim 1 wherein said main regulator plug is balanced against upstream pressure.

4. The invention as in claim 1 wherein said main regulator has a diaphragm with a working area in the range of 2 to 6 times the flow area of the source conduit.

5. The invention as in claim 1 wherein said main regulator has a diaphragm with a load-deflection characteristic in the range of 0.01 to 0.5 psi per inch of centerpoint deflection.

6. The invention as in claim 1 wherein said main regulator has a diaphragm with a load-deflection characteristic in the range of 0.1 to 0.2 psi per inch of centerpoint deflection.

7. The invention as in claim 1 wherein said main regulator has a bias spring which exerts a maximum force corresponding to a pressure difference in the range of 1 to 25 psi acting over the working area of said diaphragm.

8. The invention as in claim 1 wherein said main regulator has a bias spring which exerts a maximum force corresponding to a pressure difference in the range of 3 to 8 psi acting over the working area of said diaphragm.

9. The invention as in claim 1 wherein said main regulator orifice has a seat with a lock up force corresponding to a pressure difference in the range of 2 to 3 psi acting over said diaphragm.

10. The invention as in claim 1 wherein the maximum travel of said main regulator plug is in the range of 0.1 to 0.5 times the diameter of said main regulator orifice.

11. The invention as in claim 1 wherein the maximum travel of said main regulator plug is in the range of 0.1 to 0.3 times the diameter of said main regulator orifice.

12. The invention as in claim 1 wherein said main regulator orifice has a diameter in the range of 0.3 to 2.0 times the diameter of the source conduit.

13. The invention as in claim 1 wherein said main regulator orifice has a diameter in the range of 1.0 to 1.5 times the diameter of the source conduit.

14. The invention as in claim 1 wherein said flow restrictor is an orifice with a diameter in the range of 0.001 to 0.03 inches.

15. The invention as in claim 1 wherein said flow restrictor is an orifice with a diameter in range of 0.004 to 0.01 inches.

16. The invention as in claim 1 further including a control fluid filter upstream of said flow restrictor capable of retaining foreign particles with a size not less than ⅛ times the diameter of the opening for flow in said flow restrictor.

17. The invention as in claim 1 further including a control fluid filter upstream of said flow restrictor capable of retaining foreign particles not less than 1/6 times the diameter of the opening for flow in said flow restrictor.

18. A system for controlling process fluid flow from a source conduit to a consumer conduit to maintain a set delivery pressure at varying demand, said system comprising:
   (a) a main regulator having:
      (1) an inlet port for connection to the source conduit;
      (2) an outlet port for connection to the consumer conduit;
      (3) an orifice communicating with said inlet port and said outlet port;
      (4) a loading port;
      (5) a plug adapted for positioning to vary the opening of said orifice; and
      (6) plug positioning means for positioning said plug in response to the difference in pressure of fluid in said outlet port and pressure of fluid in said loading port;
   (b) a flow restrictor having an inlet and an outlet;
   (c) a control fluid conduit for connecting said inlet of said flow restrictor to a source of control fluid;
   (d) a control fluid conduit connecting from said outlet of said flow restrictor to said loading port on said main regulator;
   (e) a back-pressure regulator having:
      (1) an outlet port open to a low pressure sink; and
      (2) an inlet port; and
   (f) a control fluid conduit connecting said inlet port on said back-pressure regulator with said loading port on said main regulator; and
   (g) a temperature- actuated regulator having:
      (1) an inlet port;
      (2) an outlet port open to a low-pressure sink;
      (3) a normally-closed valve between said inlet port and said outlet port; and (4) means for opening said normally-closed valve when the fluid temperature in the source conduit drops below a set magnitude, and (5) a conduit connecting said inlet port on said temperature-actuated regulator with said loading port on said main regulator.

19. The invention as in claim 1 further including a control fluid filter in the control fluid conduit upstream of said back-pressure regulator inlet port capable of retaining foreign particles not less than 1/6 times the diameter of the opening for flow in said flow restrictor.

20. The invention as in claim 3 further comprising a bias spring in said main regulator, a first control fluid filter upstream of said flow restrictor and a second control fluid filter upstream of said back-pressure regulator.

21. The invention as in claim 3 further including a control fluid filter in the control fluid conduit upstream of said back-pressure regulator inlet port capable of retaining foreign particles not less than 1/6 times the diameter of the opening for flow in said flow restrictor.

22. The invention as in claim 3 wherein:
(a) said flow restrictor is an orifice;
(b) said main regulator plug positioning means includes a diaphragm;
(c) said main regulator includes a bias spring;
(d) upstream of said flow restrictor is a first control fluid filter; and
(e) upstream of said back-pressure regulator is a second control fluid filter.

23. The invention as in claim 3 wherein:
(a) said flow restrictor is an orifice with a diameter in the range of 0.001 to 0.03 inches;
(b) said main regulator plug positioning means includes a diaphragm with a working area in the range of 2 to 6 times the flow area of the source conduit and having a load-deflection characteristic in the range of 0.01 to 0.5 psi per inch of centerpoint deflection;
(c) said main regulator orifice has a diameter in the range of 0.3 to 2.0 times the diameter of the source conduit;
(d) the maximum travel of said main regulator plug is in the range of 0.1 to 0.3 times the diameter of said main regulator orifice;
(e) said main regulator orifice has a seat with a lock-up force corresponding to a pressure difference in the range of 2 to 3 psi acting over said diaphragm;
(f) located upstream of said flow restrictor is a first control fluid filter capable of retaining foreign particles with a size not less than ⅛ times the diameter of the opening for flow in said flow restrictor; and
(g) located upstream of said back-pressure regulator is a second control fluid filter capable of retaining foreign particles with a size not less than ⅛ the diameter of the opening for flow in said flow restrictor.

24. The invention as in claim 21 further comprising a normally-closed, temperature-actuated regulator having an inlet port connected to said main regulator loading port and an outlet port discharging to atmosphere, said temperature-actuated regulator including means for opening when the fluid temperature in the source conduit drops below a set magnitude.

25. A system for controlling process fluid flow from a source conduit to a consumer conduit to maintain a set delivery pressure at varying demand, said system comprising:
(a) a main regulator having:

(1) an inlet port for connection to the source conduit;
(2) an outlet port for connection to the consumer conduit;
(3) an orifice communicating with said inlet port and said outlet port;
(4) a loading port;
(5) a plug adapted for positioning to vary the opening of said orifice; and
(6) plug positioning means for positioning said plug in response to the difference in pressure of fluid in said outlet port and pressure of fluid in said loading port;

(b) a flow restrictor having an inlet and an outlet;
(c) a control fluid conduit for connecting said inlet of said flow restrictor to a source of control fluid;
(d) a control fluid conduit connecting from said outlet of said flow restrictor to said loading port on said main regulator;
(e) a back-pressure regulator having:
(1) an outlet port open to a low pressure sink; and
(2) an inlet port; and
(f) a control fluid conduit connecting said inlet port on said back-pressure regulator with said loading port on said main regulator; and
(g) a temperature- actuated regulator having:
(1) an inlet port;
(2) an outlet port
(3) a normally-open valve between said inlet port and said outlet port; and
(4) a vent from said outlet port to atmosphere normally closed by said valve; and
(5) means for closing said normally closed valve and opening said normally-closed vent when the fluid temperature in the source conduit drops below a set magnitude; said temperature-actuated regulator installed in said control fluid conduit connecting from said outlet of said flow restrictor to said loading port on said main regulator with said outlet of said flow restrictor discharging into said inlet of said temperature-actuated regulator.

26. The invention as in claim 1 further comprising:
(a) an auxiliary regulator having:
(1) an inlet port;
(2) an outlet port;
(3) a valve between said inlet port and said outlet port;
(4) means for closing said valve when the fluid pressure in said auxiliary regulator outlet port is above a set magnitude;
(b) a conduit between said auxiliary regulator inlet port and said flow restrictor inlet;
(c) a conduit between said auxiliary regulator outlet port and said flow restrictor outlet.

27. The invention as in claim 26 further comprising a temperature-actuated regulator having:
(a) an inlet port
(b) an outlet port
(c) a normally-open valve between said inlet port and said outlet port
(d) a vent from said outlet port to here normally closed by said valve; and
(e) means for closing said normally-open valve and opening said normally-closed hen the fluid temperature in the source conduit drops below a set magnitude, said temperature-actuated regulator installed in said 1 fluid conduit connecting from said outlet of said flow restrictor to said loading port on said main regulator with said outlet of said flow restrictor discharging into said inlet of said temperature-actuated regulator.

28. A method of operating a main regulator adjusted by pressure-responsive means to control a process fluid flow through said regulator from a varying pressure source conduit to a consumer conduit so as to maintain a desired delivery conduit pressure at varying demand so long as the process fluid temperature is above a prescribed temperature, said method comprising:
 (a) communicating a first side of said pressure-responsive means with the consumer conduit;
 (b) communicating a second or loading side of said pressure responsive means with a limited supply of pressurized control fluid;
 (c) venting from said limited supply of control fluid to a low-pressure sink fluid flow in excess of that required to maintain a selected loading pressure at which said main regulator controls the process fluid flow to maintain the desired delivery pressure;
 (d) venting from said limited supply of control fluid to a low pressure sink sufficient control fluid flow so that said main regulator ceases the flow of process fluid when the process fluid temperature is below the prescribed temperature.

29. The invention as in claim 18 further comprising:
 (a) an auxiliary regulator having:
   (1) an inlet port;
   (2) an outlet port;
   (3) a valve between said inlet port and said outlet port;
   (4) means for closing said valve when the fluid pressure in said auxiliary regulator outlet port is above a set magnitude;
 (b) a conduit between said auxiliary regulator inlet port and said flow restrictor inlet;
 (c) a conduit between said auxiliary regulator outlet port and said flow restrictor outlet.

* * * * *

UNITED STATES PATENT AND TRADEMARK OFFICE
CERTIFICATE OF CORRECTION

PATENT NO.   : 5,063,956
DATED        : November 12, 1991
INVENTOR(S)  : J.P. Borcuch & N.H. White It is certified that error appears in the above-identified patent and that said Letters Patent is hereby corrected as shown below:

Column 8, delete lines 26-40.

Column 9, line 26, after "restrictor" insert -- having --.

Column 12, line 62, delete "here" and substitute therefor -- atmosphere --.

Column 12, line 65, delete "hen" and substitute therefore --vent when--.

Column 12, line 68, delete "l" and substitute therefor -- control --.

Signed and Sealed this

Sixth Day of April, 1993

*Attest:*

STEPHEN G. KUNIN

*Attesting Officer*    *Acting Commissioner of Patents and Trademarks*